FIG. 7
FIG. 8
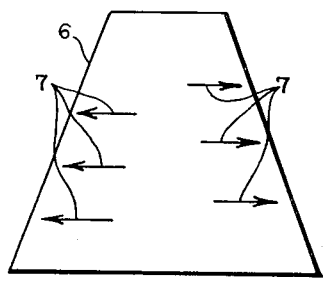
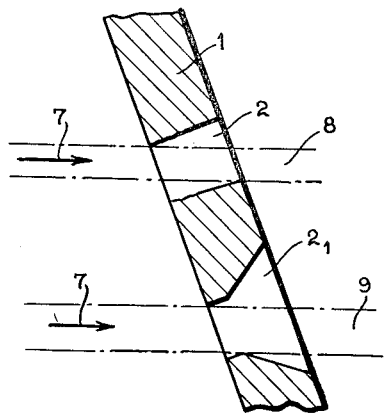

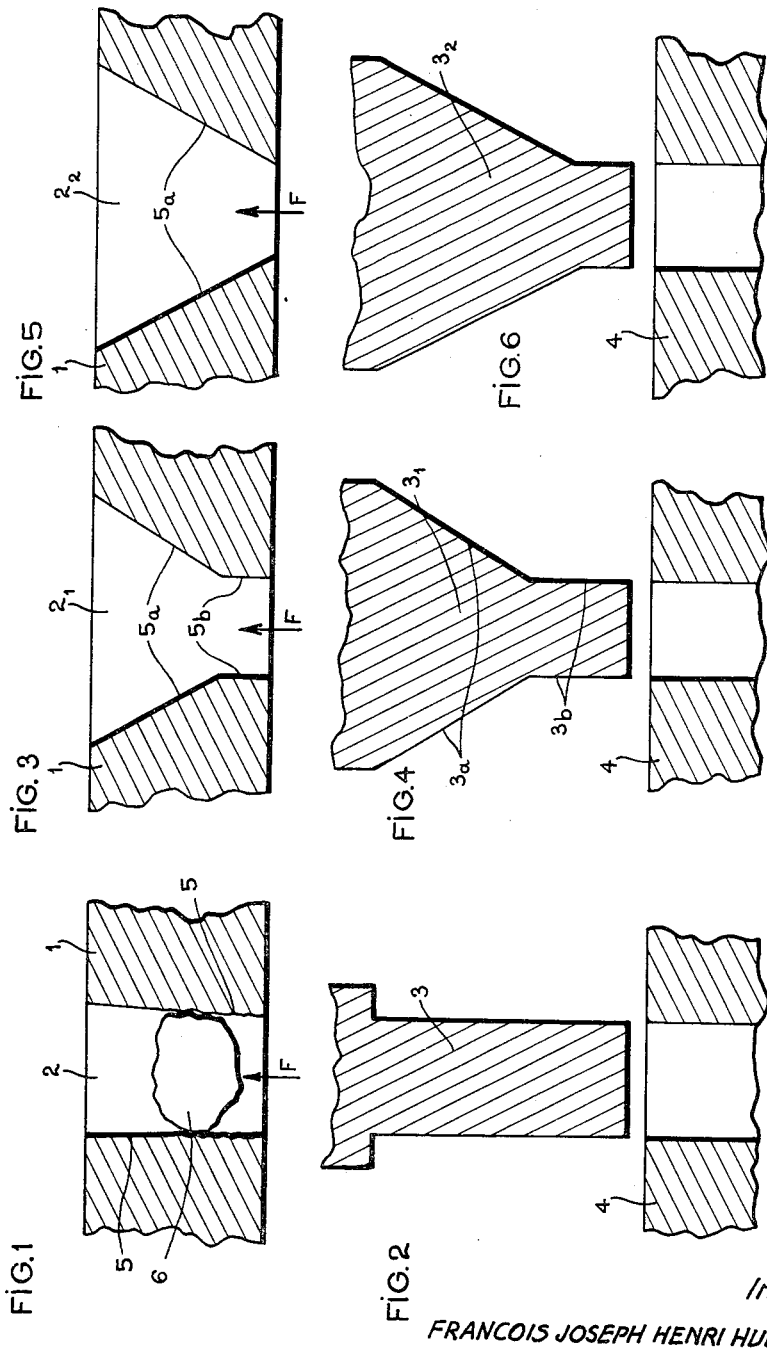

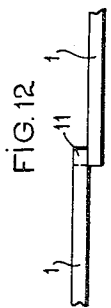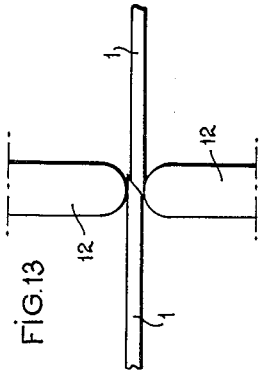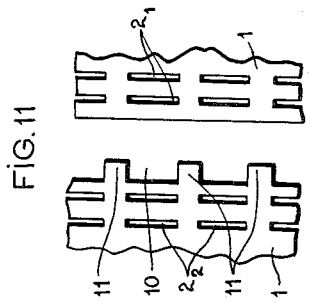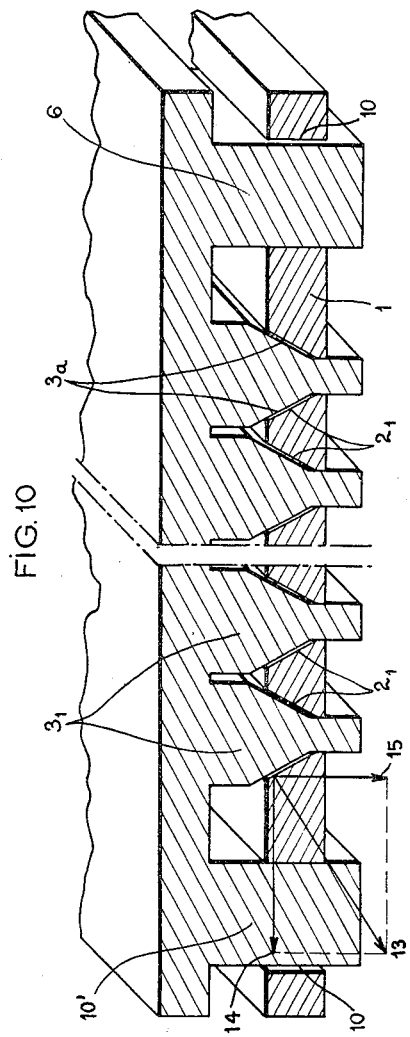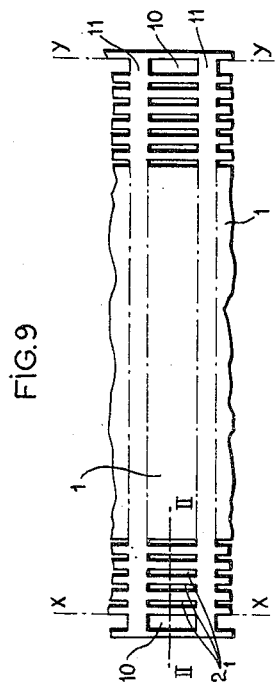
Inventor
FRANCOIS JOSEPH HENRI HUBERT MATHIEU
By Toulmin & Toulmin
Attorneys United States Patent Office 3,044,167
Patented July 17, 1962

3,044,167
GANG CUTTING AND FORMING PUNCH FOR THE MANUFACTURE OF FILTERING ELEMENTS
Francois Joseph Henri Hubert Mathieu, Saint-Cloud, France, assignor to Societe les Constructions Guinard, Courbevoie, France, a body corporate of France
Filed Feb. 12, 1960, Ser. No. 8,274
Claims priority, application France Feb. 13, 1959
1 Claim. (Cl. 29—567)

The present invention relates to a process and a device for the manufacture of perforated metal plates, more especially those used as filtering elements such as filtering elements of continuously operating centrifugal dryers generally formed of a perforated metal strip having its ends joined together. These filtering elements must have a very high resistance to corrosion and erosion and frequently the perforations or slots must be very small to retain the solid particles such as crystals particularly of very small size in suspension in a liquid.

Several processes have already been offered to obtain slots or ports of a reduced width in the filtering elements, particularly by an electrolytic deposit or by a punching, followed or not by a further rolling.

In the manufacture of such perforated metal plates by punching it is customary to use punches of uniform cross section for example of uniform rectangular cross-section. The transverse section of the slots obtained has the shape of an isosceles triangle with a very small taper. In addition, the slightly inclined faces of these slots or ports have frequently a rough surface produced by the partial stripping of the metal as soon as the punch shows the slightest wear. In such conditions, fine particles of the solid phase entering the slots by the small end thereof are caught by the roughness of the side faces or they bind together, causing rapid clogging of the filter. It has already been proposed to give the slots or ports of the filtering elements, at least on a given height in a direction perpendicular to the surface of the filtering element, a markedly decreasing transverse section or taper, but the manufacture of elements wtih such a type of perforation is very difficult.

It has been proposed, for instance, to manufacture the filtering elements in two stages, by first making in the sheet metal deep stamps or indentations having a decreasing cross section and then perforating the bottom of the stamps wtih special punches or by an attack with an acid, but if it is desired to make a large number of perforations simultaneously by this two stages process requires an accuracy which, in practice, is almost impossible to obtain. On the other hand, direct perforation with punches having a cross section decreasing towards the point, leads to difficulties when the worn-out punches are sharpened, because the shape and cutting section are modified when their ends are ground perpendicularly to the axis, to touch up the cutting edge.

It has also been proposed to punch in a sheet of metal recesses having a decreasing cross-section followed by an even section, by means of punches of corresponding shape, after which the projections formed on the lower face of the sheet metal are ground off to complete the perforations.

All these processes are long, complicated and costly.

The process according to the invention meets all these drawbacks. It is characterized in that it consists in perforating these sheets in a single operation by means of a tool having the shape of a comb, including a large number of punches, these punches having a cutting-end of constant cross-section followed by a portion of rapidly increasing section and by means of die plate having holes, the cross-section of which corresponds to the portion having the smallest cross-section of the punches.

FIGURE 1 illustrates, at a large scale, a cross-section of a slot or port such as it is made for the present.
FIGURE 2 illustrates the punch and the die-plate used to obtain the slot of FIGURE 1.
FIGURE 3 illustrates a cross-section of a slot or port made according to the invention.
FIGURE 4 illustrates the tools for its manufacture.
FIGURE 5 is a modified form of FIGURE 3 and FIGURE 6 shows the corresponding tools.
FIGURE 7 shows schematically a filtering element in a centrifugal dryer.
FIGURE 8 shows at a large scale, a part of the filtering element and illustrates an old and a new slot or port.
FIGURE 9 shows in plane a part of a perforated strip according to the invention.
FIGURE 10 is a perspective view, at an enlarged scale, along line II—II of FIGURE 9 and shows the gang punch at the end of the punching stroke, without the die-plate.
FIGURE 11 shows in plane two filtering strips, the opposed edges of which have been cut at different distances.
FIGURE 12 shows in cross-section the two filtering strips, placed for the welding.
FIGURE 13 is a corresponding view after the welding.

The filtering elements 1, which are manufactured at present by punching offer slots or ports 2 (FIGURE 1) which are obtained by means of punches 3 having parallel faces and of a chuck-plate 4. These slots 2 which are alongated in horizontal section, have, in transverse cross-section, the shape of a very slightly tapered trapezium, the faces 5 of which are, at least partly, rough on account of the partial stripping of the metal as soon as the punch 3 shows the slightest wear. Any particles such as 6 entering in the direction of the arrow (thus through the smaller base of the trapezium) can be trapped by the roughness of the sides 5, thus causing rapid clogging up of the filtering elements.

The invention aims at giving to the slots 2 (having, see FIGURE 9, a rectangular horizontal section), at least on a given height, as shown in FIGURE 3, a very important taper of the faces, as indicated in 5–$a$, the inlet portion (faces 5–$b$) being, in this case, kept to the previous slanting. According to the invention, this slot 2, is obtained by means of punches 3, such as shown in FIGURE 4, having an end 3–$b$ of constant vertical cross-section connected with a flared portion 3–$a$. In other words, as the horizontal cross-section of the slots (see FIG. 9) is of rectangular shape, it follows that the cutting front portion has a parallelepipedic shape and that the side face 3–$b$ slant outwardly in a direction away from said front portion. By using the punch 3, any unevenness which might be produced by the stripping action of the cutting front portion of the punch will be removed by the subsequent pressing action of the oblique faces 3–$a$. In addition, this pressing action on the faces 5–$a$ of the perforation causes the faces 5–$b$ to be applied against the part 3–$b$ of the punch, so that any unevennesses of the faces 5–$b$ is avoided.

It must be also understood that when the cutting end of the punch, becomes worn it can be grounded perpendicularly to its axis, to put a keen edge on it, without changing in any way the shape and the size of the perforations produced.

FIGURE 5 is a modified form of FIGURE 3: the strongly slanting faces extend throughout the whole thickness of the filtering element 1.

FIGURE 6 illustrates the shape of the punch $3_2$ used to make the perforation shown in FIGURE 5: this punch has somewhat shorter end portion of constant cross-section, followed by a longer portion of increasing section.

In the case of FIGURE 3, the partial wear of the filtering element, in the zone of the entering arrow F, will not cause any change in the degree of fineness of the filtering, but in the case of the filtering element FIGURE 5, wear will reduce progressively the degree of fineness of the filtering. In addition, it must be noted that the footing of the punch 3 is very strengthened, in the case of FIGURES 4 and 6, decreasing thereby the brittleness of the punches.

An additional advantage is obtained when the filtering element according to the invention is disposed as schematically indicated in FIGURE 7 along a surface 6, in the shape of a truncated cone, the direction of the centrifugal action being indicated by the arrows 7. This advantage clearly visible in FIGURE 8 which shows on a larger scale, a portion of a filtering element 1 with an upper slot 2 made according to the known processes and a lower slot $2_1$ made according to the present invention. For the filtering slots 2, the thickness of a stream 8 of liquid meeting no obstacle is smaller than the thickness of a stream 9 to pass by the slots $2_1$ and thus, the possibility of slots becoming choked with particles are practically avoided and, for the same degree of fineness of filtering, that is to say for a same admission cross-section of the slots 2 and $2_1$, the slots $2_1$ offers a freer passage to the liquid.

According to a further improvement shown in FIGURES 9 and 10, the punches at the ends of a gang punch intended to perforate a plate have a vertical cross-section very much larger that of the other punches so that these end punches can take up practically without any buckling, the side component force due to the punching action.

As illustrated in FIGURES 9 and 10, the filtering plate 1 is punched with the punches $3_1$ and shows elongated slots $2_1$, the transverse vertical cross-section of which is similar to the corresponding section indicated in FIGURE 3. The end punches 10' in the row of the punches $3_1$ have as a rule a constant vertical section, larger than the vertical section of the punches $3_1$. This feature is very advantageous as each inclined face 3–$a$ of the punches $3_1$ causes a stress indicated by the resultant 13 perpendicular to the face 3–$a$, which is splitted in a horizontal component 14 and a vertical component 15. The vertical component 15 is absorbed by the die-plate supporting the plate 1 and the horizontal components are opposed in each pair of two adjacent punches, except for the end punch which tends to buckle, and this, step by step, thereby greatly reducing the life of these punches. With an end punch such as 10', having a sufficient cross-section to prevent any buckling under action of the horizontal component 14 of the adjacent punch, the above drawback is suppressed.

The plate 1 has, in this case, marginal slots 10 much wider than the slots $2_1$.

The small tongues 11 separating these slots 10 after cutting off the marginal edges of the plate 1, along the broken lines X—X and Y—Y (FIGURE 9) can be used to facilitate the connection of one plate with an adjacent plate, as specially shown in FIGURES 11, 12, 13. The two plates 1 are first disposed so that the small tongues 11 of a strip 1 overlap the straight marginal portion of the adjacent plate, as shown in FIGURE 12 and the welding is carried out by means of electrodes 12 to finally obtain the desired connection as shown in FIGURE 13, the plates being disposed end to end.

What is claimed is:

A gang cutting and forming punch comprising a series of aligned punches on a gang body, each of said aligned punches having a parallelepipedic front cutting portion, an intermediate forming portion and a body connecting portion, the said intermediate portion having two side faces which flare away from said front portion into said connecting portion, the said side faces being aligned with the said series, and a terminal punch of parallelepipedic form at each terminal end of the said aligned series having a dimension in the direction of alignment that is at least as great as the body connecting portion of said aligned series of punches.

References Cited in the file of this patent

UNITED STATES PATENTS

| | | |
|---|---|---|
| 354,412 | Harrington | Dec. 14, 1886 |
| 1,446,487 | Timken | Feb. 27, 1923 |
| 1,685,287 | McEvoy | Sept. 25, 1928 |
| 1,693,011 | Woodward | Nov. 27, 1928 |